WITNESSES

Ralph Carlisle Smith
Robert D Krohn

INVENTORS
Clarence S. Jones
Thomas E. Eaton
BY
Roland A. Anderson
Attorney

NEGATIVE GATE GENERATOR

Filed Jan. 13, 1956

2 Sheets-Sheet 2

WITNESSES:
Ralph Carlisle Smith
Robert D. Krohn

INVENTORS.
Clarence S. Jones
Thomas E. Eaton
BY
Roland A. Anderson
Attorney

United States Patent Office 2,822,472

Patented Feb. 4, 1958

2,822,472

NEGATIVE GATE GENERATOR

Clarence S. Jones, Los Angeles, Calif., and Thomas E. Eaton, Los Alamos, N. Mex., assignors to the United States of America as represented by the United States Atomic Energy Commission Application January 13, 1956, Serial No. 559,082

4 Claims. (Cl. 250—27)

The present invention relates to pulse generating circuits and more particularly to rectangular pulse generators.

In the field of high speed electronics its is often necessary to provide electrical pulses of rectangular form whose total time duration is very short and whose rise time is much shorter. One of the applications for such a circuit is in high speed cathode ray oscillography where it is desired to either turn on or to increase the brilliance of the cathode ray during the time a photographic record is being taken. This is accomplished by utilizing the pulse from the pulse generator as an unblanking pulse on an appropriate element of the cathode ray tube. The same pulse can be and is often used to trigger the sweep generator for the oscilloscope at the same time as the cathode ray is turned on or intensified.

The pulse generating circuits of the prior art are not adequate for high speed oscillography and other applications which require very short pulses of uniform magnitude and exceedingly short rise and collapse times, and which in addition have an extremely high order of reliability. It is also frequently a necessity in the above and other applications that the pulse generator be capable of exceedingly constant triggering response in order that the generation of a pulse will have a precise and known time relationship with an input triggering pulse. For example, in certain applications the occurrence of the leading edge of a generated pulse must be accurately known to within a milli-microsecond.

In addition to the above enumerated behavior characteristics of pulse generators necessary in high speed applications, it is also a requirement that the duration of the pulse be susceptible to easy and accurate adjustment.

It is therefore an object of the present invention to provide a method and apparatus for generating rectangular pulses having short rise and decay times.

It is a still further object of the present invention to provide a method and apparatus for generating a pulse of short time duration whose inception can be predetermined and accurately known.

It is a still further object of the present invention to provide a pulse of short time duration issuing from a circuit that is simple, rugged and reliable.

Further objects and advantages of the present invention will be apparent from the following description and accompanying drawing hereby made a part of this disclosure wherein.

In accordance with the present invention a first capacitance discharges a portion of its charge through a load resistor to initiate and provide the body of a pulse, and a second capacitor impresses the potential of its charge, with opposite potential polarity across the load resistor to terminate the pulse.

Figure 1:
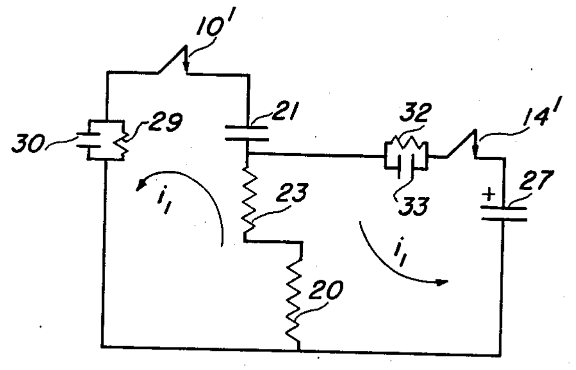
Figure 1 is an equivalent schematic diagram useful in explaining the principles of operation of the invention.

The principles of operation are made clear by reference to Figure 1. The pulse is formed by the closing of switch 10' which is equivalent to the thyratron 10 of Figure 2. This completes a series circuit of charged capacitance 21 (potential $e_{c1}$) with resistors 20, 23 and 29. It is assumed, at this point in the analysis, that pulse terminating switch 14' is open.

The Kirchhoff equation for the circuit is:

$$e_{c1}=i_1r_{29}+i_1r_{23}+i_1r_{20} \quad (1)$$

and the magnitude of the output pulse across resistor 20 is $i_1r_{20}$.

Figure 2:
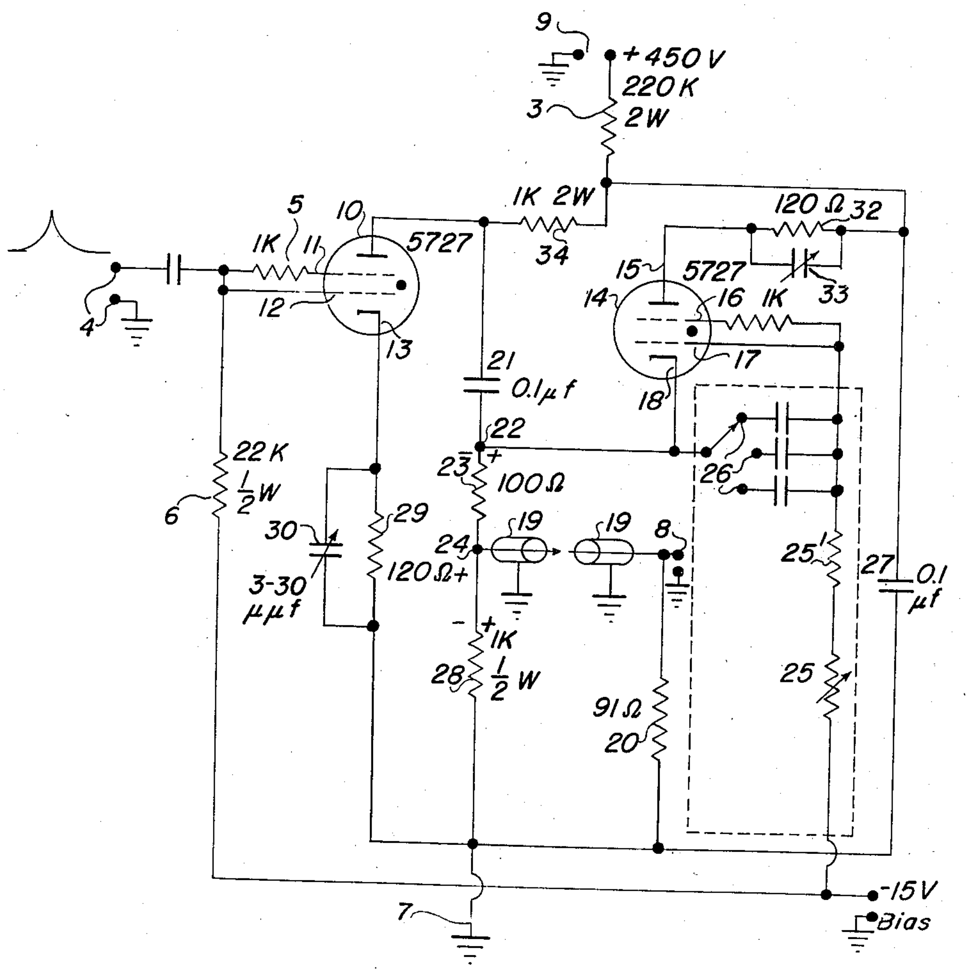
Figure 2 is a circuit diagram of a preferred embodiment of the present invention.

The pulse is terminated by the closing of switch 14' which corresponds to thyratron 14 in Figure 2. The Kirchhoff equations for both loops are $$e_{c21}=i_1r_{29}+i_1r_{20}+i_1r_{23} \quad (2)$$

$$e_{c27}=i_2r_{32}+i_2r_{20}+i_2r_{23} \quad (3)$$

and $$i_1r_{29}+i_1r_{20}+i_1r_{23}=i_2r_{32}+i_2r_{20}+i_2r_{23} \quad (4)$$

Since resistors $r_{32}$ and $r_{29}$ are equal, and the capacitors 21, 27 are charged to the same potential so that $e_{c21}$ is equal to $e_{c27}$, the current $i_1$ is equal to current $i_2$. Therefore rewritten Equation 4 with $i_1$ substituted for $i_2$ appears as follows:

$$i_1r_{29}+i_1r_{20}+i_1r_{23}=i_1r_{32}+i_1r_{20}+i_1r_{23}$$

and since $r_{29}$ is equal to $r_{32}$, this quantity can be subtracted from both sides of the equation, thereby leaving, with the current in the second loop again identified as $i_2$ $$i_1(r_{20}+r_{23})=i_2(r_{20}+r_{23})$$

or $$i_1(r_{20}+r_{23})-i_2(r_{20}+r_{23})=0$$

and since $$i_1r_{23}=i_2r_{23} \text{ then } i_1r_{20}-i_2r_{20}=0$$

It follows that the closing of switch 14' reduces the potential across resistor 20 to zero and the pulse is terminated.

Referring to Figure 2, tubes 10 and 14 are thyratrons, which are connected in a circuit so that control grids 11 and 12 of tube 10, and 16 and 17 of tube 14, are normally held biased below the firing potential. Output cable 19 is terminated by (matched) terminating resistor 20. The output pulse appears across the terminating resistor.

Capacitor 21 is charged through serially connected resistors 28, 23, 34 and 3.

The control electrode in the case of a triode type thyratron, or the control electrodes of a tetrode type thyratron 10 of the type shown in the drawing are coupled to one of input terminals 4. Resistor 5 in series with control electrode 11 is for the usual purpose of current limiting. The control electrodes are also connected to a source of bias potential of suitable value through isolating resistor 6.

Capacitor 21 is connected at one terminal to the anode of the tube 10 and to a source of charging potential through isolation resistors 34 and 3. The other terminal of capacitor 21 is connected through series connected resistors 23 and 28 to the reference potential point of the circuit which for convenience is shown as an earth connection 7. A cable 19 connects the junction point 24 of resistors 23 and 28 to a matching resistor 20. Resistor 20 may be located proximate the remaining circuit components if an output cable of negligible length and capacitance is used, but it should be connected across the far end of the output cable if the cable has appreciable shunt capacitance. The reason for this will presently become apparent.

The pulse terminating thyratron 14 may be of the same type as that of thyratron 10. The anode of tube 14 is connected to one terminal of capacitor 27 through resistance-capacitance network 32—33. The remaining terminal of capacitor 27 is connected to ground point 7. Capacitor 27 is equivalent in all respects to capacitor 21, and is also connected to the same source of energizing potential 9 through resistor 3.

The control electrodes 16 and 17 of thyratron 14 are coupled to point 22 of the capacitor 21 discharge circuit through one of a plurality of different selected size capacitors 26, and to a source of negative bias through decoupling adjustable resistor 25, in series with fixed resistor 25'.

In operation, the leading edge and body portion of the desired pulse is initiated by the impression of an input signal pulse with positive polarity of sufficient magnitude on the control electrodes 11, 12 of thyratron 10. When tube 10 fires, its anode-cathode interelectrode resistance becomes so low that it can be neglected in this explanation. It follows that the firing of tube 10 effectively connects fully charged capacitor 21 in series with resistor-capacitor network 29—30, resistor 23, and resistor 28 in shunt with the output network $C_{31}$ (the cable capacitance) and resistor 20.

In order to obtain an extremely short rise time and avoid curvature of the leading edge of the output pulse due to inductance in the circuit connections, and the shunt capacitance particularly of cable 19, capitance 30 is of an adjustable type. Capacitor 30 effectively short circuits resistor 29 during the early part of the rise time of the pulse to permit a desired amount of overshoot of the pulse input to cable 19. The accelerated rise time or overshoot provides the charging current for the cable capacitance and for other stray capacitance so that the output pulse across resistor 20 has a leading edge and body portion of good rectangular form.

When thyratron 10 is fired by an input signal pulse the potential on the cathode of thyratron 14 is depressed by an amount equal to the voltage drops across resistors 20 and 28 in parallel with each other and in series with 23.

The provision of the coupling capacitor 26 causes the potential on the control electrodes 16, 17 of thyratron 14 to be depressed simultaneously and substantially equally initially with the depression of the potential on the cathode. It follows that thyratron 14 cannot fire until the negative potential on its control electrodes decreases in magnitude until firing threshold is encountered. The duration for the reduction of this potential, i. e., partial discharge of the capacitor 26 to firing threshold of thyratron 14 is determined by the selection of the appropriate one of capacitors 26 and by adjustment of the value of resistor 25.

Thyratron 14 fires at the instant that the potential on the control electrodes 16, 17 reaches firing threshold. The firing of thyratron 14 establishes continuity in the pulse terminating circuit so that fully charged capacitor 27 discharges through network 32—33, resistor 23 and resistor 28 in shunt with output network resistor 20 and the cable capacitance.

As hereinbefore explained, the discharge of capacitor 27 establishes potentials across the circuit elements in series therewith, in opposition to the potentials established by capacitor 21. However, the charge in cable 19 tends to sustain current through resistor 20 with the result that if the initial potential established across resistor 20 due to the discharge of capacitor 27 were only equal to the steady state potentials established by the discharge of capacitor 21 the trailing edge of the pulse would be sloped and not vertical. To eliminate this effect adjustable capacitor 33 is provided in shunt with resistor 32 to in effect short circuit resistor 32 when thyratron 14 first fires thereby causing an initial surge of current or overshoot in the circuit in series therewith, thereby creating a potential at point 24 which is above zero by an amount which compensates for the ffect of the cable capacitance.

The exact values of adjustable capacitors 30 and 33 to effect vertical leading and trailing edges and sharp corners with the body of the generated pulse are best determined by adjustment while the pulses are observed on a wide bandwidth oscilloscope.

As explained supra, the duration of the body of the generated pulse is determined by the values of the selected capacitor 26 and the value of resistor 25. In general these capacitors should be small in capacitance compared to capacitor 21 and still large enough to maintain a cut-off potential on the control electrodes for at least the selected pulse duration when utilized with series resistors 25 and 25' of convenient size.

It should be noted that immediately after thyratron 14 fires, capacitors 21 and 27 are connected effectively in series with each other through both thyratrons, networks 29—30 and 32—33, and resistor 34 with the result that both condensers are quickly discharged and the potentials on the anodes of both thyratrons diminish to below the sustaining values. It follows that the thyratrons become extinguished and the device is able to ready itself for the next input signal pulse.

In the event thyratron 10 should extinguish before thyratron 14, capacitor 27 completes its discharge through resistors 23 and 28 until the anode-cathode potential of thyratron 14 drops to the extinguishing value.

Figure 3:
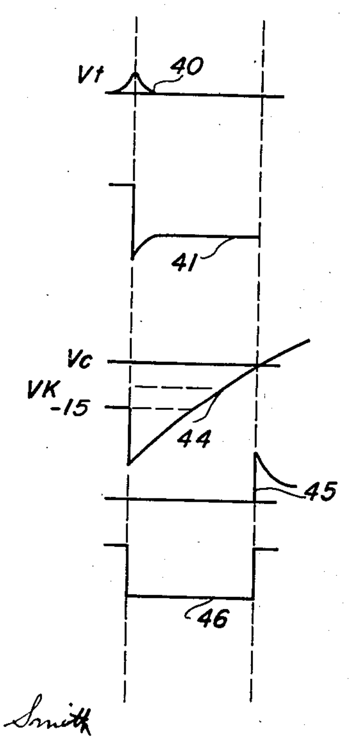
Figure 3 is a family of curves showing the wave form present in various circuit elements of the present invention during the time a pulse is being generated.

With reference to Figure 3, the electrical changes associated with a pulse issuing from the circuit of Figure 1 are readily apparent. An input pulse 40 applied to grids 11 and 12 of tube 10 starts conduction in tube 10. Conduction of tube 10 initiates the negative pulse 41 at time A. Pulse 41 continues until the RC circuit (resistor 25 and condenser 26) allows the potential (curve 44) on grids 16 and 17 of tube 14 (Figure 1) to reach firing threshold. The potential on the cathode of thyratron 14 is similar in shape to that shown in curve 41 but is of greater magnitude. The point $V_c$ on curve 44 is the point at which the grid is sufficiently positive with respect to cathode 18 to cause tube 14 to become conducting.

Curve 45 shows the resultant potential at point 24 due to the firing of thyratron 14, and curve 46 shows the resultant pulse shape at the output of the cable.

Certain features which allow this circuit to perform in the desired manner are important to the short pulse time characteristics. Condensers 21 and 27 are low inductance condensers intended for use where it is desired to remove the condenser charge in as short a time as possible as is done in the circuit of this invention. Resistors 23, 28 and 29 are non-inductive and are arranged along with condenser 21 to have as low a stray capacity as possible. The same is true of the circuit associated with condenser 27. Curve 46 of Figure 3 shows an idealized pulse. It must be realized that, since this pulse issues from a discharging condenser, that the horizontal lower line will not actually be horizontal but will rise slowly with time. Condensers 21 and 27 are chosen of sufficient size so that this pulse rise will not be greater than 10 percent for the longest pulse desired. In the circuit of the practical embodiment shown it has been found that a capacity of about 0.1 mfd. is sufficient for this purpose.

Pulses formed by the circuit shown in the preferred embodiment of the present invention and having the values of components as shown have a magnitude of 135 volts and a widely adjustable pulse length which is in the range of 0.1 μsec. This pulse appears from a low impedance of 0.1 μsec. to 10 μsec. This pulse appears from a low impedance source and the current flowing in cable 19 during a pulse is the order of 1 ampere. The rise time and decay time is the order of 0.01 μsec. respectively.

It is understood that the embodiment shown in the drawing and herein described is by way of example and that other embodiments of the invention may occur to those skilled in the art. It is accordingly understood that it is intended to cover all embodiments which fall within the spirit of this invention and that the scope of the invention is to be limited only by the appended claims taken in view of the prior art.

What is claimed is:

1. A pulse generator comprising a first capacitor, a two terminal switch, and a two conductor transmission line having a terminating load resistor at one end, means electrically connecting one plate of said first capacitor to one conductor of the transmission line at its other end and the other conductor of the transmission line at said other end to one terminal of said switch, means including a resistor electrically connecting the other terminal of the switch to the other plate of the first capacitor, a potential source connected in series with a resistor and said first capacitor, and a second capacitor connected in shunt with said last named resistor for compensating for stray circuit capacitance and capacitance in said transmission line, whereby closure of the switch and discharge of the first capacitor generates an output pulse at the terminating load resistor, the leading edge of which has substantially a right angle relationship with the body of the pulse.

2. A rectangular pulse generating device comprising first and second equal capacitors, a first thyratron and a load resistor, a second thyratron, and a source of unidirectional capacitor charging potential; a first terminal of the first capacitor being directly connected to the first thyratron anode, electrical connecting means including a load resistor connecting the first capacitor other terminal to ground, a high frequency compensating network connecting the cathode of the first thyratron to ground, means for negatively biasing the control electrode of the first thyratron, and electrically coupling means coupling one terminal of an input trigger pulse source to the control electrode of the first thyratron; a resistor connecting the first capacitor first terminal to a first terminal of the second capacitor, a current charging resistor connecting the first terminal of the second capacitor to the positive terminal of said potential source, a high frequency compensating network connecting the first terminal of the second capacitor to the anode of the second thyratron, electrically conducting resistance means connecting the second thyratron control electrode to a source of negative bias, electrically conducting means directly connecting the second thyratron cathode to the first capacitor other terminal, coupling capacitor means coupling the second thyratron cathode to the second thyratron control electrode, electrically conducting means connecting the second capacitor other terminal to ground, the negative terminal of the charging potential source, and the other terminal of the input trigger pulse source being grounded.

3. The device of claim 2 in which each of the high frequency compensating networks consists of a resistor in shunt with an adjustable capacitor, the extreme values of the capacitor being such as to include the value of distributed capacitance of a load connected effectively in shunt with the load resistor.

4. The device of claim 2 in which the coupling capacitor means connecting the second thyratron cathode to the junction of the electrically conducting resistance means and the second thyratron control electrode is a plurality of coupling capacitors of selected different values and a switch for selectively connecting one of said coupling capacitors in the circuit, and the electrically conducting resistance means includes an adjustable resistor whereby the length of the pulse generated by the device can be selectively adjusted.

References Cited in the file of this patent

UNITED STATES PATENTS

| | | |
|---|---|---|
| 2,280,949 | Hall | Apr. 28, 1942 |
| 2,284,850 | Smith | June 2, 1942 |
| 2,301,195 | Bradford | Nov. 10, 1942 |
| 2,309,525 | Mohr | Jan. 26, 1943 |
| 2,496,543 | Kanner | Feb. 7, 1950 |